May 1, 1934.  R. GEPT  1,956,897

MECHANICAL HOE

Filed Dec. 16, 1932   5 Sheets-Sheet 1

Inventor:
René GEPT
by ...
Attorneys.

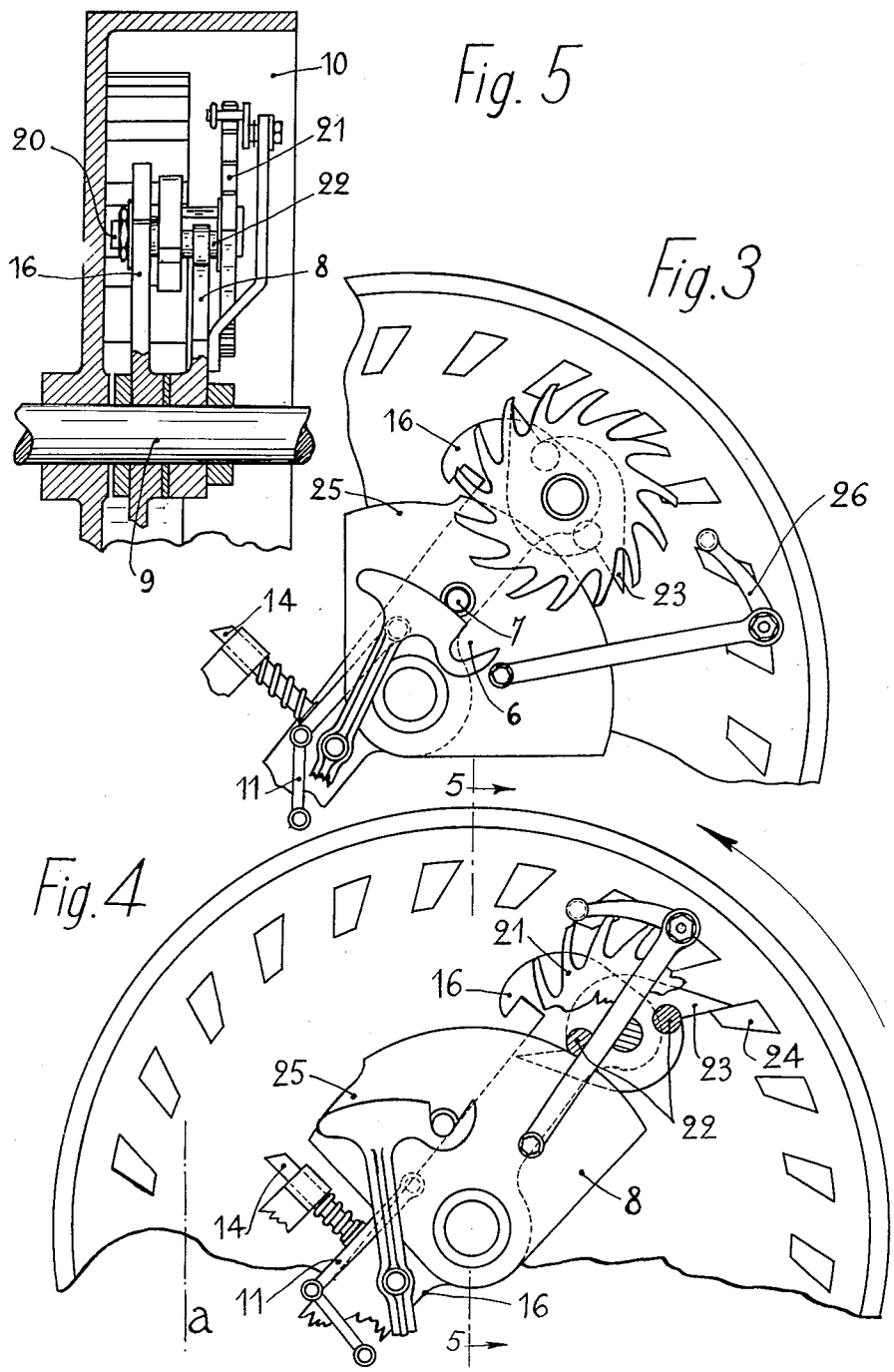

May 1, 1934.  R. GEPT  1,956,897
MECHANICAL HOE
Filed Dec. 16, 1932  5 Sheets-Sheet 3

Inventor
René GEPT
by C A Snow & Co.
Attorneys.

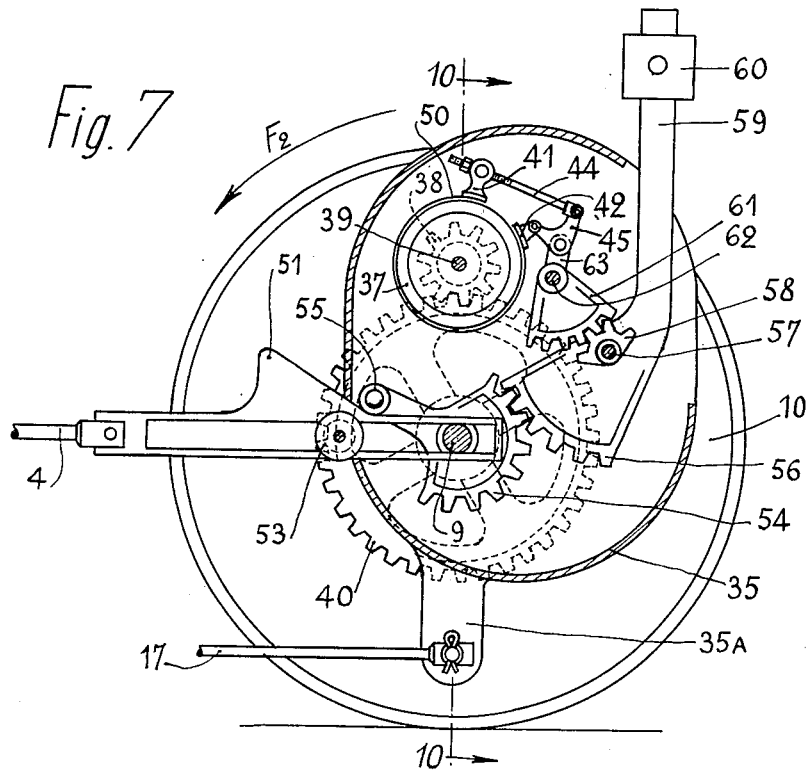
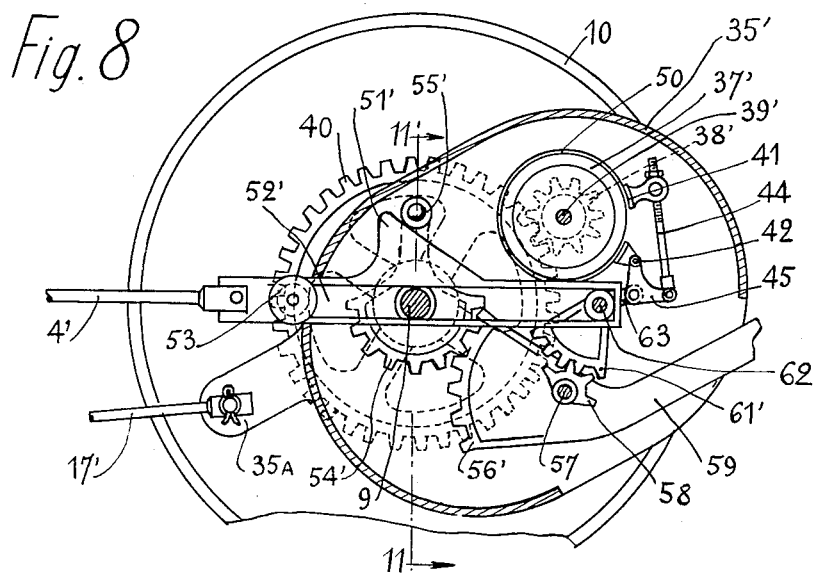

May 1, 1934.  R. GEPT  1,956,897
MECHANICAL HOE
Filed Dec. 16, 1932  5 Sheets-Sheet 5
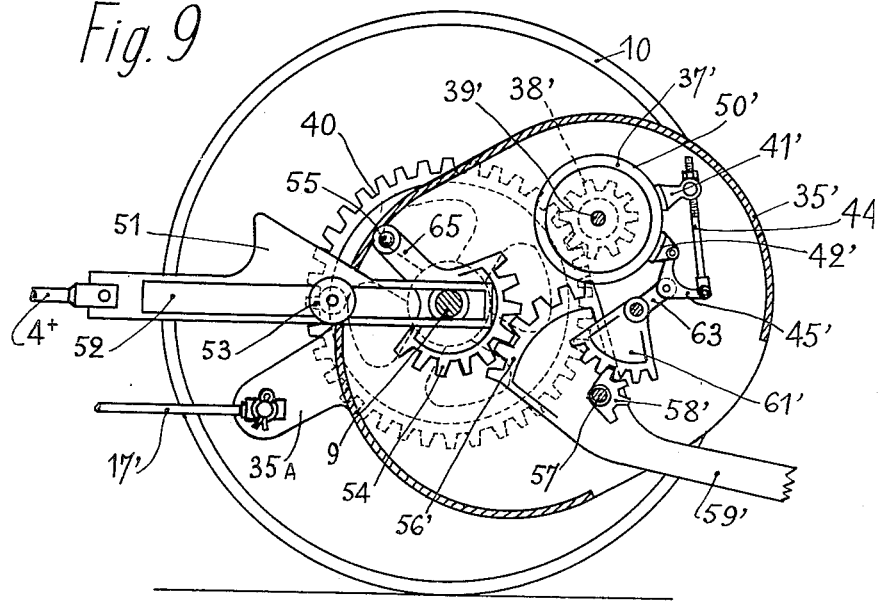
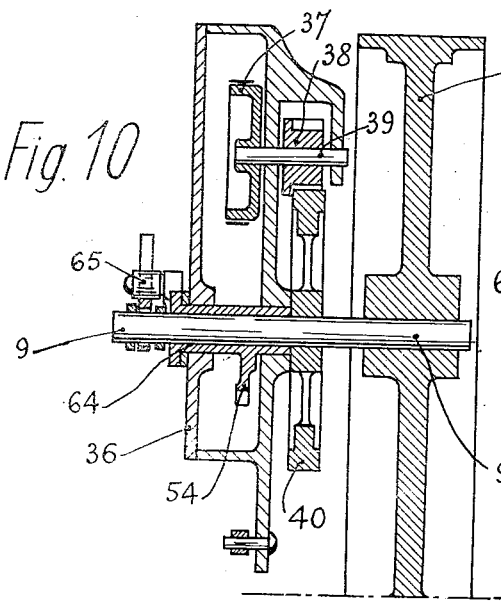
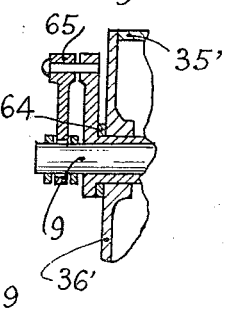
Inventor.
René GEPT
by C. A. Snow & Co.
Attorneys.

Patented May 1, 1934

1,956,897

UNITED STATES PATENT OFFICE 1,956,897

MECHANICAL HOE

René Gept, Tarascon, France

Application December 16, 1932, Serial No. 647,661
In France January 22, 1932

11 Claims. (Cl. 97—45)

The present invention relates to mechanically driven hoes in which the hoeing blade is caused to loosen the soil between plants placed in a line although the hoe is moving in a direction parallel to said line.

To this effect, the hoe according to my invention comprises a frame in which is journalled the axle of the carrying wheel and to which are pivoted on the one hand a hoeing blade and on the other hand a control lever subjected to the action of a spring. The hoeing blade is connected to a rocking member pivoted about the spindle of the carrying wheel. According to an essential feature of my invention, said rocking member is connected with said control lever in such manner as to be normally maintained in a position called position of rest and to be allowed to turn backward when said control lever comes into contact with a plant. On the other hand interlocking means are provided for coupling said rocking member with the carrying wheel, said interlocking means being so devised as to be brought into action as soon as the control lever ceases to be in contact with a plant, whereby the rocking member is brought back to its position of rest by said carrying wheel. When this movement is terminated, the rocking member is again connected with the control lever in the position of rest.

Another object of my invention is to provide a hoe of the type described in which the presence of hard bodies in the soil across the path of travel of the hoeing blade does not risk to injure said blade or any other organ of the apparatus. To this effect, according to my invention, an elastic element is interposed between the hoeing blade and the rocking member, so as to allow the hoeing blade to yield when it is brought into contact with an obstacle and then to come back to its initial operative position as soon as the device has moved past said obstacle.

Still another object of my invention is to combine a hoe of the type above referred to with a plough in such a manner that the working organs of the plough are capable of yielding back at the same time as the hoeing blade.

Preferred embodiments of the present invention will be hereinafter described with reference to the accompanying drawings, given merely by way of example, and in which:

Fig. 3 shows the device of Fig. 2 after the control lever has come into contact with a plant;

Fig. 4 shows the same device after the control lever has left the plant so as to come back into its original position;

Fig. 5 is a sectional view on the line 5—5 of Fig. 4;

Fig. 7 is an elevational view, on a larger scale, of the carrying wheel with the means for controlling the hoeing blade, the front plate of the casing being supposed to be removed. In this figure, the device is shown in the position for which the hoeing blade is working between two adjacent plants of the same line and the control lever is moving freely between two plants;

Fig. 8 is an elevational view of the same device in the position for which the control lever bears against the plant around which the hoeing blade is to turn;

Fig. 9 is an elevational view of the same device in the position for which the control lever leaves the plant in order to come back to its initial position, shown in full lines in Fig. 1;

Fig. 10 is a sectional view on the line 10—10 of Fig. 7;

Fig. 11 is a sectional view on the line 11—11 of Fig. 8;

Figure 1:
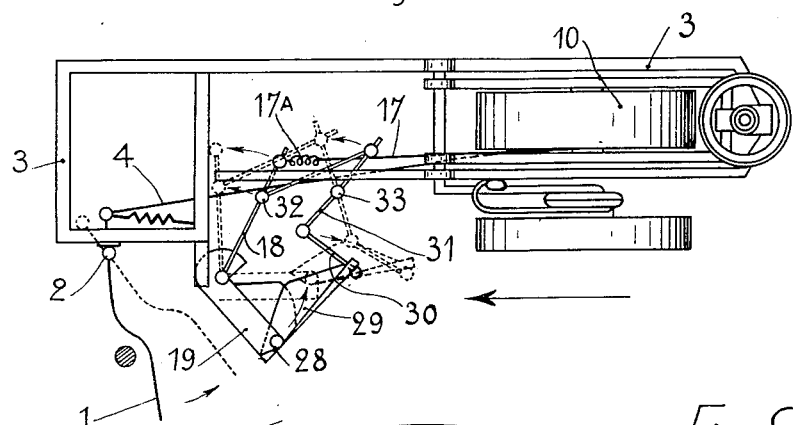
Fig. 1 is a diagrammatic plan view of an embodiment of the device according to my invention.

The hoeing apparatus, diagrammatically shown in plan view in Fig. 1, comprises a frame 3, a carrying wheel 10, and a control device which will be hereinafter described below. In Figs. 2, 3, 4, and 5, the frame has not been shown for the sake of clearness.

The device for controlling the hoeing blade essentially comprises (Fig. 1) a bent control lever 1 adapted to pivot about a point 2 of frame 3 and which actuates, through rod 4, a lever 5 (Figs. 2 to 5). Said lever 5 is connected, through interlocking means such as a hook 6, to a stud 7 integral with a sector 8 pivoted about the spindle 9 of carrying wheel 10. A knuckle 11, pivoted on the one hand at 12 to sector 8 and on the other hand at 13 to the frame of the apparatus, carries by one of its branches the bolt 14 of a locking device 15 rigidly secured to the frame. The end of said bolt 14 is engaged in a recess provided in a rocking member 16 which is also pivoted about spindle 9 and is disposed side by side with sector 8. The lower portion of rocking member 16 is connected, through rod 17, with an arm 18 rigidly connected to the hoeing blade 19. An elastic coupling, such as a spiral spring 17ª, is preferably interposed between arm 18 and rod 17. With this arrangement, the hoeing blade is allowed to yield back when it is brought into contact with an obstacle in the soil, even when it is locked with the rocking member.

My invention further comprises a device through which the plough for laying bare the lower parts of the plant stems is coupled with the hoeing blade and yields back at the same time as the latter when it moves past a plant. The share 28 of the plough 29 (Fig. 1) is pivotally assembled with the end of the hoeing blade 19 and its support is connected, through three jointed branches 30, 31, and 32, with the arm 18 of the hoeing blade. The branch 31 of this linkage pivots about an axis 33 fixed to the frame of the apparatus.

The upper arm of rocking lever 16 carries a spindle 20 at right angles thereto, which supports the mechanism for coupling the rocking member with the carrying wheel. This mechanism comprises a ratchet wheel 21, a disk provided with two lugs 23 of sufficient length as to be able to project between the teeth 24 of an inwardly toothed crown concentrically carried by the rim of carrying wheel 10, and two rollers 22 journalled on spindles parallel to spindle 20 and extending between said ratchet wheel and said disk.

Ratchet wheel 21 and the disk with two lugs 23 are located on either side of sector 8 respectively (Fig. 5). Spindle 20 is sufficiently close to the periphery of sector 8, which acts as a rolling cam, in order that said disk may not make a complete revolution without one of the rollers 22 coming into contact with the edge of said sector 8. This system is clearly shown in Fig. 4 in which a portion of ratchet wheel 21 is cut away.

Figure 2:
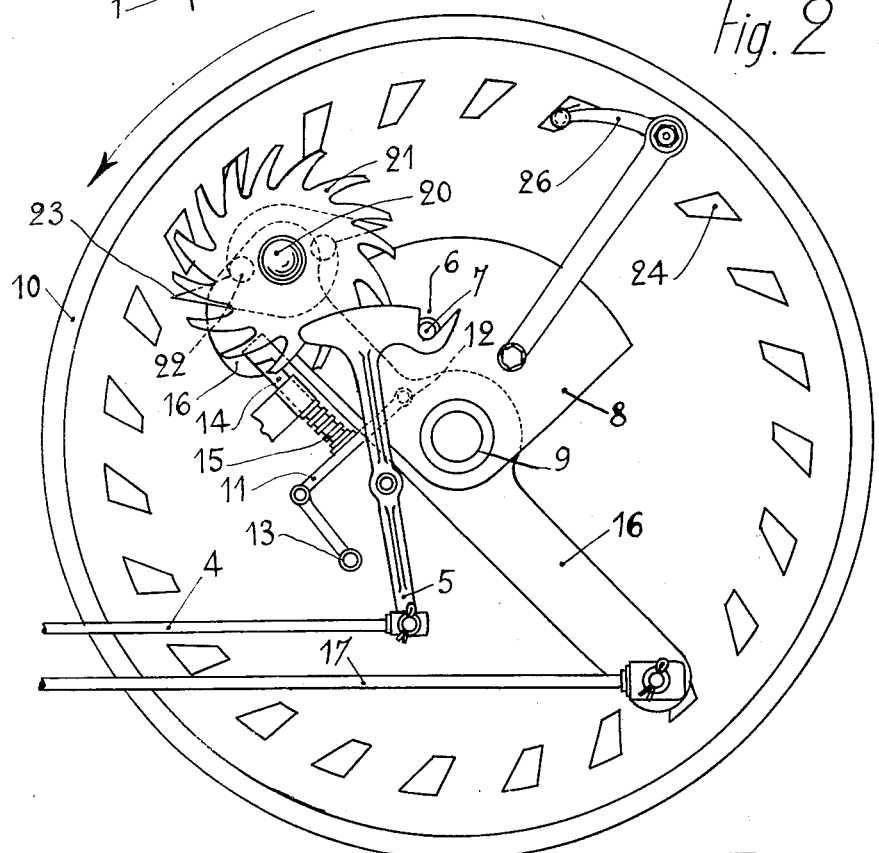
Fig. 2 is an elevational view on a larger scale of the carrying wheel provided with the means for locking the hoeing blade and the organs that control the rotation of the latter; in this figure the hoeing blade is shown in the operative position.
Figure 12:
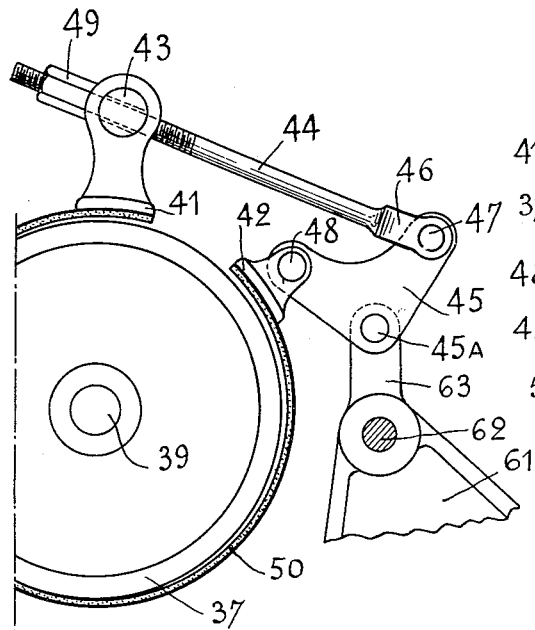
Fig. 12 is an elevational view, on a larger scale, of the friction brake.
Figure 13:
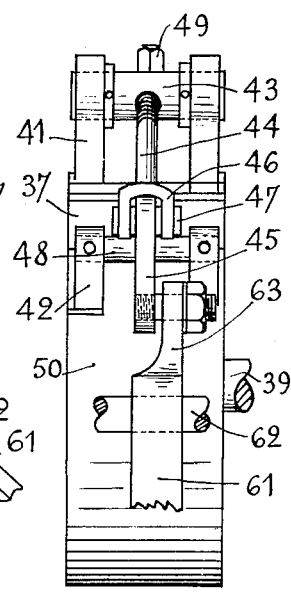
Fig. 13 is an end view corresponding to Fig. 12.

The front end of sector 8 is cut off at 25 in order that, when the disk comes opposite said cut part of sector 8 there may exist a sufficient clearance between said sector and the roller 22 that was in contact therewith, whereby said disk is then permitted to rotate freely (Fig. 2).

A spring pawl 26, which serves to actuate ratchet wheel 21, is fixed to the rear end of sector 8.

The operation of the device above described is as follows:

When the hoeing blade is in its operative position, between two plants, as shown in solid lines in Fig. 1, the various parts of the device are disposed as shown in Figs. 1 and 2. Rocking lever 16 is kept in position by locking device 15, while sector 8 is kept in position by hook 6. Rocking member 16 in turn locks, through transmission rod 17 and the arm 18, the hoeing blade in a stable and fixed position whereby it can overcome the resistance of the soil.

As the apparatus moves in the direction of the arrow, control lever 1, the direction of which is substantially at right angles to the direction of the line of plants, now comes into contact with a plant. Lever 1 therefore rotates toward the rear and, through transmission rod 4, lever 5, and hook 6, it immediately causes sector 8 to pivot toward the rear. The two branches of knuckle 11 then straighten out and bolt 14 is caused to slip out from its recess in member 16, thus unlocking said rocking member 16. The amplitude of the oscillation of the control lever is so chosen that said member 16 is unlocked when the lever is located exactly in the same transverse plane as the end of the hoeing blade. When the lever has moved past this position and has become parallel with the line of plants, the eccentric position of stud 7 with respect to the axis of lever 5 has already compelled said stud 7 to leave hook 6. Consequently, from that time on, control lever 1 has no action whatever on the displacement of sector 8.

Due to the unlocking action above explained, the hoeing blade is left free to move and the resistance of the soil to its forward movement causes it to pivot in a backward direction when it comes near a plant. It results therefrom that the upper arm of rocking member 16 is caused to move toward the rear as shown in Fig. 3.

When, due to the forward movement of the apparatus, control lever 1 leaves the plant, it is quickly brought back into its initial position by return spring 27, connected to the frame. Stud 7 again engages the hook of lever 5. Sector 8 is therefore rotated toward the front (Fig. 4). Pawl 26 then comes into operative engagement with ratchet wheel 21 and causes it to rotate through an angle of 90°. One of the teeth of toothed crown 24 engages with one of the lugs 23 and one of the rollers 22 comes into contact with the edge of sector 8 thus maintaining the lug 23 above referred to in engagement with said tooth of crown 24. As the carrying wheel 10 further rotates, it drives rocking member 16 together with it, thus bringing the hoeing blade back to its original position by overcoming the resistance of the soil. When rocking member 16 comes opposite the part 25 of sector 8, the disk can turn freely and lug 23 is disengaged from tooth 24. Knuckle 11 is brought back to its initial position and the locking is effected. The mechanism is now in the position shown in Fig. 1 and the operation above described can be repeated.

The modification of my invention shown in Figs. 6 to 13 of the accompanying drawings, in which the same reference characters designate the same organs, likewise comprises a frame 3, a carrying wheel 10, and a special control device, which will be hereinafter described.

The device for controlling the movements of the hoeing blade comprises (Fig. 6) a bent lever 1, pivoted at $a$ to the frame 3. Said lever 1 is connected, through a rod 66, to a bent lever 67 pivoted at $b$ to the frame and subjected to the action of a spiral spring $r$ interposed between one of the arms of lever 67 and the frame 3 of the apparatus.

The free end of lever 67 is pivotally jointed to a rod 4 connected with a cam 51 (Figs. 7, 8, and 9). Said cam is provided with a slot 52 in which is engaged a roller 53 the spindle of which is rigidly connected to the frame of the machine.

The control mechanism proper consists of a casing 35 having a removable cover 36 and capable of oscillating about the axle 9 of carrying wheel 10 (Fig. 10). A toothed sector 54, rigidly connected through a sleeve 64 with a crank 65 carrying at its end a roller 55, is pivotally mounted about shaft 9. Toothed sector 54 meshes with a toothed sector 56 oscillating about a spindle 57 rigidly fixed to the casing. The last mentioned sector (56) carries a lever 59 provided with a mass 60, which may eventually be replaced by a tension spring constantly urging said lever toward the rear of the machine. A toothed sector 58 integral with sector 56 meshes with a toothed sector 61 oscillating about a spindle 62 carried by casing 35. Toothed sector 61 is provided with a tail 63 (Figs. 11 and 12) pivoted to a bent lever 45. The latter (Figs. 12 and 13) is pivoted about a pin 47 fixed in the fork 46 of a lever 44 the threaded end of which passes freely through a spindle 43, its position being fixed by means of an adjusting nut 49. Spindle 43 is mounted loose in the bearings of one shoe of brake 41, to which is fixed one of the ends of the friction band 50. Said friction band 50 is wound about a brake pulley 37 and its other end is fixed to a brake shoe 42 pivotally connected at 48 with bent lever 45. Brake pulley 37 (Figs. 7 to 10) is keyed to a shaft 39 carried by casing 35 and rigidly connected with a toothed wheel 38 which meshes with a toothed wheel 40 keyed to the shaft 9 of the carrying wheel 10.

Casing 35 is provided, at its lower part, with a tail 35$^A$ to which is articulated one of the ends of a rod 17, the other end of said rod being connected to the bent arm 18 of the hoeing blade 19, preferably through elastic means, such for instance as a spiral spring 17$^A$ allowing the hoeing blade to yield back when it comes into contact with an obstacle in the ground, even when the rocking member is locked in position.

My invention further comprises a device through which a plough coupled with the hoeing blade yields back simultaneously with the latter when it moves past a plant. The share 29 of the plough 28 (Fig. 6) is coupled, through a pivot, with the end of the hoeing blade 19 and its support is connected, through a linkage including three branches 30, 31 and 32, with the bent arm 18 of the hoeing blade. The branch 31 of said transmission system pivots about an axis 33 fixed to the frame of the apparatus.

Figure 6:
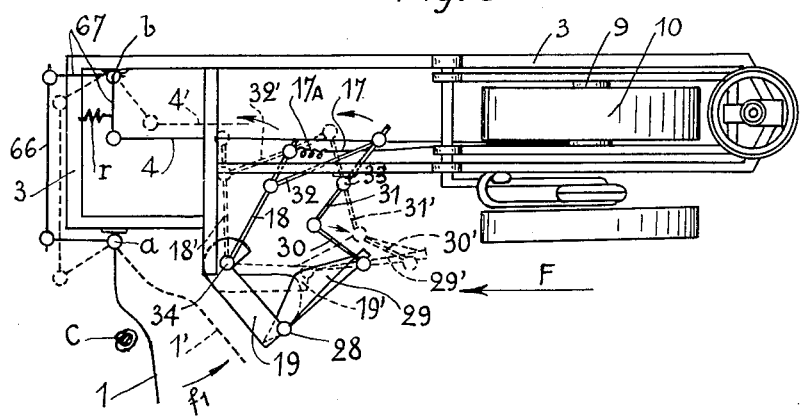
Fig. 6 is a diagrammatic plan view showing another embodiment of the device according to my invention.

The operation of the device according to my invention is as follows:

In Fig. 6 the device is shown in the position corresponding to the working of the hoeing blade. Lever 1 is moved between two adjacent plants of a line of plants in the direction of arrow F. The control mechanism proper occupies the position shown in Fig. 7. Toothed sectors 58, 61, and 54—56 are locked as a result of roller 55 being applied against the upper part of cam 51, in a position such that the brake band is not stretched. Pulley 37, driven by toothed wheel 38, which itself meshes with toothed wheel 40, therefore rotates freely.

During the forward movement of the device, the resistance opposed by the soil to the displacement of hoeing blade 19 tends constantly, through bent arm 18 and rod 17, to swing the casing toward the right hand side. But, as soon as this movement is started, toothed sector 56, in mesh with toothed sector 54, which bears on cam 51 through roller 55, pivots in a clockwise direction. Now, said movement of rotation causes the brake band to be stretched and couples casing 35 with pinion 38, which remains always in mesh with toothed wheel 40. As soon as said swinging movement of the casing is started, the casing is immediately brought back toward the left-hand side into its initial position. The casing is therefore subjected to a series of oscillations of very small period the amplitude of which is so small as to establish, for practical purposes, a state of equilibrium that maintains the casing nearly immobile while the hoeing blade is working.

As soon as control lever 1 comes into contact with plant C (Fig. 6), it pivots in the direction of arrow $f^1$ until it occupies the position shown in 1'. The connecting rods cause cam 51 to move toward the right hand side into position 51' (Fig. 8). In the course of this displacement, roller 55, due to its upward movement along cam 51, imparts to toothed sector 54 a rotary movement in a clockwise direction, which movement results in brake band 50 being unstretched. The resistance opposed by the soil to the displacement of hoeing blade 19 now becomes stronger and the blade is rotated into a position 19', eventually driving with it the share of plough 29, which comes at 29'. This pivoting movement of the hoeing blade results in a traction being exerted on rod 17 and in the casing being pivoted into the position shown in Fig. 3.

As the machine further advances, lever 1 leaves plant C and, under the action of spring $r$, or of any equivalent device, comes back into its initial position; so does cam 51 (Fig. 9). Roller 55, which, under the action of the weight of mass 60 and of toothed sectors 54—56, previously rested on the cam, now loses its support and swings toward the left hand side. The toothed sectors pivot under the influence of mass 60 in a direction such that the brake band is applied against brake pulley 37 which is consequently coupled with pinion 38. The latter, which is in mesh with toothed pinion 40, causes casing 35 to pivot toward the left hand side into its initial position, for which roller 55 is applied against the base of cam 51 (Fig. 6). The casing further rotates through a very small angle but, as the roller is blocked, the brake band is loosened and the casing ceases to be driven by toothed wheel 40. The mechanism is now in the position shown in Fig. 6 and the operation above described can be repeated.

While I have, in the preceding description disclosed what I deem to be practical and efficient embodiments of my invention, it should be well understood that I do not wish to be limited thereto as there might be changes made in the arrangement, disposition, and form of the parts without departing from the principle of my invention as comprehended within the scope of the appended claims.

What I claim is:

1. A hoe of the type described comprising in combination, a frame, a carrying wheel journalled in said frame, a hoeing blade pivoted to said frame, a control lever pivoted to said frame substantially at right angles to said wheel, yielding means for returning said lever to its position at right angles to said wheel, a rocking member journalled on said wheel about the axis thereof, locking means for maintaining said rocking member in fixed position with respect to said frame, connecting means between said rocking member and said blade, means, operatively connected with said lever for throwing said locking means out of action when said lever is pivoted toward the rear, coupling means, operatively connected with said lever, for coupling said rocking member with said wheel when the control member is brought back to its initial position, and means for throwing said coupling means out of action and said locking means into action as soon as the rocking member is back to its initial position.

2. A hoe according to claim 1 in which the connecting means between the rocking member and the hoeing blade include an elastic connection.

3. A hoe according to claim 1 in which the connecting means between the rocking member and the hoeing blade include a spring.

4. A hoe according to claim 1 further comprising a plough for laying bare the feet of the plants and means for coupling said plough with said hoeing blade adapted to allow said plough to yield at the same time as said blade.

5. A hoe according to claim 1 in which the connecting means between the rocking member and the hoeing blade include an elastic connection, said hoe further including a plough for laying bare the feet of the plants, and means for coupling said plough with said blade adapted to allow said plough to yield at the same time as said blade.

6. A hoe of the type described comprising in combination, a frame, a carrying wheel journalled in said frame, a hoeing blade pivoted to said frame, a control lever pivoted to said frame substantially at right angles to said wheel, a spring for returning said lever to its position at right angles to said wheel, a rocking member journalled on said wheel about the axis thereof, a bolt slidable in said frame, a sector mounted loose on the axle of said wheel, a knuckle connected at one end to said frame and at the other end to said sector for controlling the movement of said bolt, said rocking member being provided with a hole for the end of said bolt, a rod operatively connected with said control lever, an arm pivoted to said frame in eccentric relation with respect to said wheel, and jointed at one end with said rod, interlocking means at the other end of said arm and on said sector whereby said sector can be caused to rotate by said arm but is disconnected therefrom after a given rotation due to the eccentricity of the axis of rotation of said arm, means, operatively connected with said sector for coupling said rocking member with said wheel when the control lever is brought back to its position at right angles to the wheel, and means for releasing said rocking member from said wheel when the rocking member is back to its initial position.

7. A hoe of the type described comprising in combination, a frame, a carrying wheel journalled in said frame, a hoeing blade pivoted to said frame, a control lever pivoted to said frame substantially at right angles to said wheel, a spring for returning said lever to its position at right angles to said wheel, a rocking member journalled on said frame about the axis of said wheel, a linkage member connecting said rocking member with said hoeing blade, a bolt slidable in said frame, a sector mounted loose on the axle of said wheel, a knuckle connected at one end to the said frame and at the other end to said sector for controlling the movement of said bolt, said rocking member being provided with a hole for the end of said bolt, a rod operatively connected with said control lever, an arm pivoted to said frame in eccentric relation with respect to said wheel, and jointed at one end to the last mentioned rod, interlocking means at the other end of the last mentioned arm and on said sector whereby said sector can be caused to rotate by said arm through a certain angle but is disconnected therefrom after that rotation due to the eccentricity of the axis of rotation of said arm, a pin on said rocking member, a ratchet wheel mounted loose on said pin, a disk integral with said ratchet wheel, two lugs on said disk, two rollers carried by said disk adapted to roll along the periphery of said sector, a pawl carried by said sector adapted to engage said ratchet wheel, and teeth on the inner periphery of the rim of said carrying wheel adapted to engage one of said lugs when one of said rollers is in contact with the periphery of said sector, said sector being cut at its front part whereby the disk can rotate freely when the roller reaches said part of the sector and the lug that was engaged between the teeth of the carrying wheel is released.

8. A hoe of the type described comprising in combination, a frame, a carrying wheel journalled in said frame, a hoeing blade pivoted to said frame, a control lever pivoted to said frame substantially at right angles to said wheel, a spring for returning said lever to its position at right angles to said wheel, a rocking member journalled on said wheel about the axis thereof, a cam, means for connecting said cam with said control lever, means for guiding said cam with respect to said frame, a toothed sector mounted loose on the axle of the carrying wheel, a crank integral with said sector and bearing against said cam, another toothed sector journalled on said rocking member and in mesh with the first mentioned toothed sector, a tail on the second mentioned sector, means on said tail for urging said sectors in the direction that applies said crank against said cam, coupling means, operatively connected with said control lever, for connecting said rocking member with said wheel when the control lever, after being rotated toward the rear, is brought back to its initial position, and means for throwing said coupling means out of action when the rocking member has been brought back to its initial position due to its being coupled with the carrying wheel.

9. A hoe according to claim 8 in which the cam is provided with a longitudinal slot, the means for guiding said cam with respect to said frame consisting of a roller journalled on said frame and engaging said slot, the means provided on said tail for urging the sectors in the direction that applies the crank against said cam consisting of a mass provided at the end of said tail.

10. A hoe of the type described comprising in combination, a frame, a carrying wheel journalled in said frame, a hoeing blade pivoted to said frame, a control lever pivoted to said frame substantially at right angles to the direction of travel of said hoe, a spring for returning said lever to its position at right angles to the direction of travel of said hoe, a rocking member journalled on said wheel about the axis thereof, a cam, means for connecting said cam with said control lever, means for guiding said cam with respect to said frame, a toothed sector mounted loose on the axle of the carrying wheel, a crank integral with said sector and bearing against said cam, another toothed sector journalled on said rocking member and in mesh with the first mentioned toothed sector, a tail on the second mentioned sector, means on said tail for urging said sectors in the direction that applies said crank against said cam, a toothed wheel keyed on the axle of the carrying wheel, another toothed wheel in mesh with the first mentioned one journalled in said rocking member, a drum integral with the last mentioned toothed wheel, a brake band surrounding said drum, a shoe at each end of said band, a lever pivoted to said rocking member for controlling the relative positions of said shoes, a toothed sector journalled in said rocking member adapted to actuate the last mentioned lever, and a toothed sector integral with the second mentioned toothed sector and concentric therewith in mesh with the third mentioned toothed wheel.

11. A hoe according to claim 10 in which the cam is provided with a longitudinal slot, the means for guiding said cam with respect to said frame consisting of a roller journalled on said frame and engaging said slot, the means provided on said tail for urging the sectors in the direction that applies the crank against said cam consisting of a mass provided at the end of said tail.

GEPT, RENÉ.